United States Patent

Paye

[11] Patent Number: 6,067,642
[45] Date of Patent: May 23, 2000

[54] DIAGNOSTIC METHOD WITH PRE-ASSEMBLY FAULT RECORDING LOCK-OUT

[75] Inventor: James R. Paye, Farmington Hills, Mich.

[73] Assignee: Automotive Systems Laboratory, Inc., Farmington Hills, Mich.

[21] Appl. No.: 08/390,985

[22] Filed: Feb. 21, 1995

[51] Int. Cl.[7] .................................................. H02H 3/05
[52] U.S. Cl. .............................. 714/45; 714/31; 714/47; 714/57
[58] Field of Search .................. 395/183.21, 184.01, 395/185.01, 183.2, 183.01, 183.06, 185.1, 183.16, 180; 714/45, 31, 47, 48, 44, 25, 30, 57

[56] References Cited

U.S. PATENT DOCUMENTS

| 4,817,418 | 4/1989 | Asami et al. | 395/183.21 |
| 5,200,958 | 4/1993 | Hamilton et al. | 395/183.21 |
| 5,210,757 | 5/1993 | Barlow et al. | 395/183.01 |
| 5,255,208 | 10/1993 | Thakore et al. | 395/183.21 |
| 5,379,407 | 1/1995 | Todd | 395/183.21 |

*Primary Examiner*—Christine Trinh L. Tu
*Attorney, Agent, or Firm*—Lyon, P.C.

[57] ABSTRACT

A diagnostic method (100) with pre-assembly fault recording lock-out inhibits fault recording during assembly of a main system until the system has been determined operation at least once (116). The method will still note the detection of system failures/errors (112) by activating a warning lamp (120), but will not record these faults into memory until the system has determined that the main system has been powered up without any errors at least once (118 and 122). Thus, since these faults are not stored in memory during manufacture/assembly, the method of the present invention obviates the need for any additional assembly step(s) of erasing and/or clearing the memory, or externally controlled recording inputs for the diagnostic system.

5 Claims, 1 Drawing Sheet

DIAGNOSTIC METHOD WITH PRE-ASSEMBLY FAULT RECORDING LOCK-OUT

BACKGROUND OF THE INVENTION

The present invention generally relates to diagnostic systems, and more particularly to an improved method and system for diagnosing and controlling the recording of faults and/or failures in an electronic component during automated assembly.

Many electrical circuits, particularly circuits utilized in safety or protection systems, generally employ a self-diagnostic arrangement which tests for faults in the circuit, and subsequently, records any detected faults. Further, warning devices are typically actuated in response to a recorded fault so that appropriate servicing of the electrical circuit can be performed in a timely manner.

However, such self-testing/recording arrangements typically become problematic during manufacture or assembly of the main system. Specifically, the circuits tend to comprise different subcomponents which are individually installed during assembly of the overall system. As each subcomponent is mounted, the circuit is momentarily activated, or "powered up", to verify correct installation of the subcomponent. When the system is only partially assembled, the self-testing circuit will inherently diagnose a fault due to the incomplete circuit, and record the detection of the fault into a memory.

Therefore, known manufacturing processes must provide an external control input which would inhibit the self-testing circuit from detecting and/or recording any faults during assembling, or provide an additional manufacturing step of purging or erasing the fault recording memory after the circuit is completely assembled. Neither of those solutions are particularly satisfactory because of the added complexity and/or cost to the manufacturing process.

SUMMARY OF THE INVENTION

Therefore, an object of the present invention is to provide a self-diagnostic system which does not require any external control to prevent recording of faults during an assembly process.

Another object of the present invention is to provide a method of automatic inhibiting of pre-assembly fault recording in a self-diagnostic system.

In accordance with the present invention, in a diagnostic system comprising means for monitoring and evaluating an operational status of a device and a memory for recording the operational status, a method for controlling the recording of a fault status comprises the steps of determining if an error has been detected, and if an error has been detected, determining whether the device has been operational at least a first time. In response to the device not having been operational at least a first time, the present invention will not record the error into the memory. However, in response to the device having been operational at least a first time, the detected error is recorded into the memory. Further, if an error has not been detected, the method of the present invention determines whether the device has been operational at least a first time, and in response to the device not having been operational a first time, the status of the device is updated by recording in the memory that the device has now been detected as being operational a first time.

In further accordance with the present invention, the device comprises a main circuit component having a plurality of subcircuit components, and the step of determining whether the main circuit component has been operational at least a first time inhibits the diagnostic system from recording detected faults in the memory during periodic assembly testing of the main circuit component.

The present invention will be more fully understood upon reading the following detailed description of the preferred embodiment in conjunction with the accompanying drawings.

DETAILED DESCRIPTION OF THE PREFERRED EMBODIMENT

Figure 1:
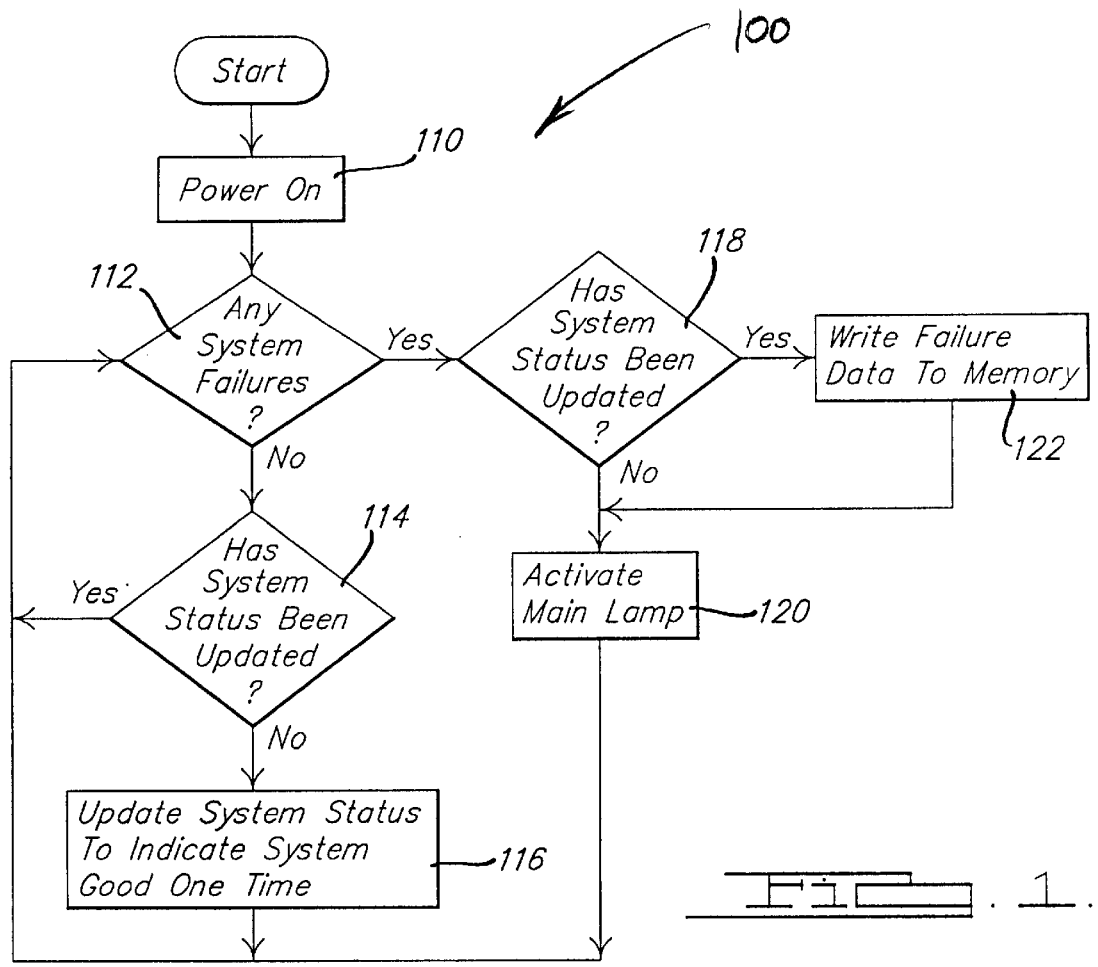
FIG. 1 is a flow chart illustrating the diagnostic lock-out method of the present invention.
Figure 2:
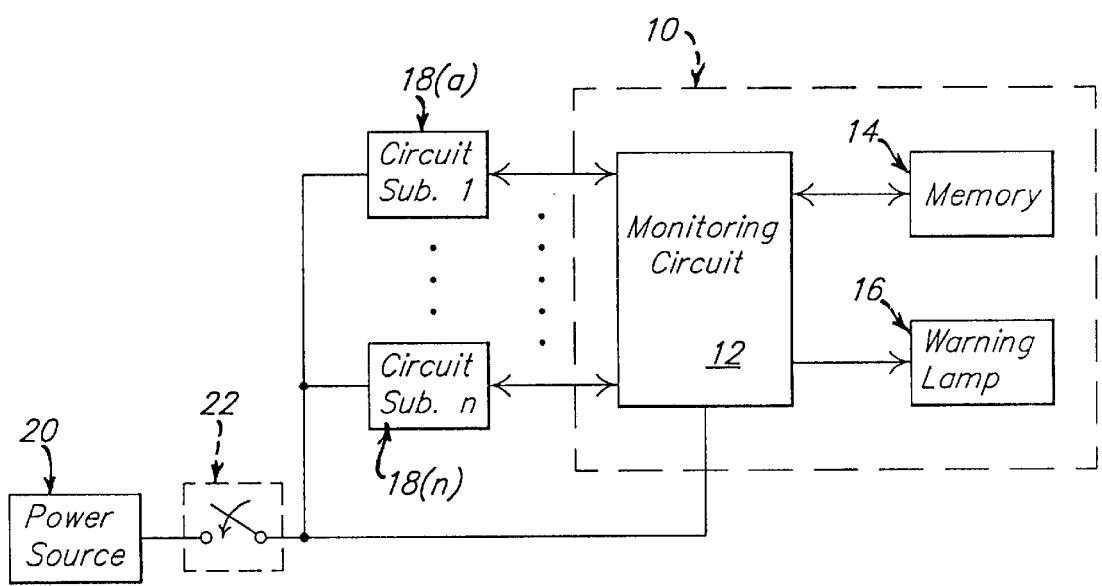
FIG. 2 is a block diagram of a self-diagnostic circuit incorporating the method of the present invention.

Referring to FIG. 1, a flow chart illustrates the overall diagnostic lock-out method 100 of the present invention as utilized with a self-diagnostic system 10 illustrated in block diagram in FIG. 2. The self-diagnostic circuit basically includes a microprocessor monitoring unit 12, a read/write memory 14, such as an $E^2PROM$, and a warning means such as a lamp 16. The self-diagnostic system 10 monitors the operational status of various circuit subcomponents 18a through 18n utilized in a main system, such as a plurality of circuit subcomponents used in a vehicle crash detection system. The status of each circuit subcomponent 18 is stored in memory 14. The detection of a faulty component is further indicated by activating the warning lamp 16, thereby alerting appropriate individuals to the need for servicing or repair.

During typical manufacture/assembly of the various subcomponents 18 into the main system assembly, electrical power from a power source 20 is momentarily applied by closing a switch 22 after each subcomponent 18 is mounted and/or connected into the main system. Each time the power is turned on during the manufacturing process at step 110, the microprocessor monitoring unit 12 will perform a series of diagnostic tests at step 112 to determine whether any of the system components has failed. A specific location within memory 14 is utilized by the monitoring unit 12 to store the operating status of the main system and/or individual circuit subcomponents.

Upon initial "power up" of the system, the memory location will contain either a "00" or "ff" depending on the manufacturer of the memory chip. If no system failures are detected, and the system determines the system status stored in memory 14 has not been updated at step 114, the memory location will be written with a specific value at step 116 to indicate that the system has been determined to be functional for the first time. However, if the system is not functional at step 112, as will be the case when only some of the subcomponents 18 have been installed, and the system determines at step 118 that the memory location does not contain the specific value indicating the system has been determined to be functional a first time, the warning lamp 16 will be turned on at step 120, but no failures will be recorded to memory 14. As noted above, this condition only occurs in a system that is not fully assembled.

Once the system is fully assembled and powered up and free from any system malfunctions, the memory location will be written to with the specific value indicating the system was functional a first time at step 116. Thus, after this point, if the system 10 detects an error at step 112, the system 10 will detect that the main system has been fully operational at least once at step 118, and in response will record the detected failure in memory 14 at step 122 and activate the warning lamp 16.

Therefore, the diagnostic lock-out method of the present invention effectively inhibits fault recording during assembly of the system without requiring any external control inputs and/or hardware. The system 10 will still note the detection of system failures/errors by activating the warning lamp 16, but will not record these faults into memory until the system has determined that the main system has been powered up without any errors at least once. Further, since these faults are not stored in memory during manufacture/assembly, the method of the present invention also obviates the need for any additional assembly step(s) of erasing and/or clearing the memory 14.

It will be understood that the foregoing description of the preferred embodiment of the present invention is for illustrative purposes only, and that the various structural and operational features herein disclosed are susceptible to a number of modifications, none of which departs from the spirit and scope of the present invention as defined in the appended claims.

I claim:

1. In a diagnostic system comprising means for monitoring and evaluating an operational status of a device and a memory for recording the operational status, a method for controlling the recording of a fault status comprising the steps of:

(a) determining if an error has been detected;
   (b) determining whether said device has been operational at least a first time;
   (c) in response to said device not having been operational at least a first time, not recording said detected error in said memory; and
   (d) in response to said device having been operational at least a first time, recording the detected error in said memory.

2. The method of claim 1 further comprising the step of if an error has not been detected; and said device has not been operational a first time, recording in said memory that said device has been detected as being operational a first time.

3. The method of claim 1 wherein the step of determining whether said device has been operational at least a first time comprises accessing the operational status stored in said memory.

4. The method of claim 1 wherein said device comprises a main circuit component having a plurality of subcircuit components, and said step of determining whether said main circuit component has been operational at least a first time inhibits said diagnostic system from recording detected faults in said memory during periodic assembly testing of said main circuit component.

5. The method of claim 1 wherein step (c) further comprises activating a warning means.

* * * * *